United States Patent
Lee et al.

(10) Patent No.: US 10,135,061 B2
(45) Date of Patent: Nov. 20, 2018

(54) COMPOSITE FOR ANODE ACTIVE MATERIAL, ANODE INCLUDING THE COMPOSITE, LITHIUM SECONDARY BATTERY INCLUDING THE ANODE, AND METHOD OF PREPARING THE COMPOSITE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Jaemyung Lee, Seoul (KR); Seongho Jeon, Yongin-si (KR); Hosang Park, Seoul (KR); Byoungsun Lee, Seoul (KR); Kanghee Lee, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 59 days.

(21) Appl. No.: 15/169,878

(22) Filed: Jun. 1, 2016

(65) Prior Publication Data
US 2016/0365569 A1    Dec. 15, 2016

(30) Foreign Application Priority Data

Jun. 9, 2015   (KR) .......................... 10-2015-0081503

(51) Int. Cl.
*H01M 4/36* (2006.01)
*H01M 4/38* (2006.01)
(Continued)

(52) U.S. Cl.
CPC ............. *H01M 4/364* (2013.01); *H01M 4/38* (2013.01); *H01M 4/485* (2013.01); *H01M 4/625* (2013.01);
(Continued)

(58) Field of Classification Search
CPC ........ H01M 4/364; H01M 4/38; H01M 4/485; H01M 10/0525; H01M 2004/027
(Continued)

(56) References Cited

U.S. PATENT DOCUMENTS 8,241,794 B2    8/2012  Sheem et al.
8,703,338 B2    4/2014  Patoux et al.
(Continued)

FOREIGN PATENT DOCUMENTS

JP    2004356078 A    12/2004
JP    2009521082 A     5/2009
(Continued)

OTHER PUBLICATIONS

Cetinkaya et al., "Enhancing electrochemical performance of silicon anodes by dispersing MWCNTs using planetary ball milling", Microelectronic Engineering, vol. 108, 2013, pp. 169-176.
(Continued)

*Primary Examiner* — Harold Y Pyon
*Assistant Examiner* — Danny N Kang
(74) *Attorney, Agent, or Firm* — Cantor Colburn LLP

(57) ABSTRACT

A composite anode active material, the composite including: a metal particle; a carbon-containing material, and a garnet-type lithium ion conductor, wherein an amount of the garnet-type lithium ion conductor is greater than 1 part by weight and less than 5 parts by weight, based on 100 parts by weight of a total weight of the metal particle, the carbon-containing material, and the garnet-type lithium ion conductor.

20 Claims, 8 Drawing Sheets

(51) Int. Cl.
  *H01M 4/485* (2010.01)
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/027* (2013.01)

(58) Field of Classification Search
  USPC .......................................................... 252/500
  See application file for complete search history.

(56) References Cited

U.S. PATENT DOCUMENTS

| | | | |
|---|---|---|---|
| 2014/0377655 A1* | 12/2014 | Mun | H01M 4/366 429/220 |
| 2015/0188126 A1 | 7/2015 | Kang et al. | |
| 2015/0270536 A1 | 9/2015 | Kawakami et al. | |

FOREIGN PATENT DOCUMENTS

| | | |
|---|---|---|
| KR | 1020070056765 A | 6/2007 |
| KR | 1020140036535 A | 3/2014 |
| KR | 1020140094676 A | 7/2014 |

OTHER PUBLICATIONS

Fan et al., "High performance lithium ion battery anodes based on carbon nanotube-silicon core-shell nanowires with controlled morphology", Carbon, vol. 59, 2013, pp. 264-269.

Forney et al., "Prelithiation of Silicon-Carbon Nanotube Anodes for Lithium Ion Batteries by Stabilized Lithium Metal Powder (SLMP)", Nano Letters, vol. 13, 2013, pp. 4158-4163.

Xiao et al., "A multilayer Si/CNT coaxial nanofiber LIB anode with a high areal capacity*", Energy & environmental Science, vol. 7, 2014, p. 655-661.

* cited by examiner

COMPOSITE FOR ANODE ACTIVE MATERIAL, ANODE INCLUDING THE COMPOSITE, LITHIUM SECONDARY BATTERY INCLUDING THE ANODE, AND METHOD OF PREPARING THE COMPOSITE

CROSS-REFERENCE TO RELATED APPLICATION

This application claims the priority to and benefit of Korean Patent Application No. 10-2015-0081503, filed on Jun. 9, 2015, in the Korean Intellectual Property Office, and all the benefits accruing therefrom under 35 U.S.C. § 119, the content of which is incorporated herein in its entirety by reference.

BACKGROUND

1. Field

This disclosure relates to a composite for an anode active material, an anode including the composite, a lithium secondary battery including the anode, and a method of preparing the composite.

2. Description of the Related Art

High capacity silicon-based anode materials are receiving much attention as anode materials for next generation lithium batteries because silicon can theoretically provide a specific capacity of about 4,200 mAh/g. However, such anode materials undergo a volume expansion of about 300% or greater during lithium intercalation and deintercalation processes. Such a high volume expansion causes cracking and pulverization of the anode materials. Accordingly, an electrical short and continuous electrolyte decomposition occur, resulting degraded charge and discharge characteristics, e.g., initial charge and discharge efficiencies, average charge and discharge efficiencies, lifespan characteristics, and high rate discharge characteristics. These problems have impeded commercialization of the anode materials, despite their high theoretical capacity. Thus there remains a need for an improved anode material.

SUMMARY

An embodiment includes a composite of an anode active material, the composite including a metal particle, a carbon-based material, and a garnet-type lithium ion conductor.

An embodiment includes an anode including the composite.

An embodiment includes a lithium secondary battery including the anode.

An embodiment includes a method of preparing the composite.

Additional aspects will be set forth in part in the description which follows and, in part, will be apparent from the description, or may be learned by practice of the presented embodiments.

According to an embodiment, a composite for an anode active material includes: a metal particle; a carbon-containing material; and a garnet-type lithium ion conductor, wherein am amount of the garnet-type lithium ion conductor may be greater than 1 part by weight and less than 5 parts by weight, based on 100 parts by weight of a total weight of the metal particle, the carbon-containing material, and the garnet-type lithium ion conductor.

The metal particle may include silicon (Si), tin (Sn), germanium (Ge), aluminum (Al), an alloy of two or more of Si, Sn, Ge, and Al, or a combination thereof.

The carbon-based material may include a carbon nanotube (CNT), a carbon nanofiber, graphene, graphite, or a combination thereof.

An amount of the metal particle may be in a range of about 10 parts to about 90 parts by weight, based on 100 parts by weight of the carbon-based material.

According to an embodiment, an anode includes the composite anode active material.

The anode may further include an additional anode active material.

According to an embodiment, a lithium secondary battery includes the anode.

According to one or more exemplary embodiments, a method of preparing a composite for an anode active material includes: mixing a metal particle and a garnet-type lithium ion conductor to form a first mixture; milling the first mixture; mixing the milled first mixture with a carbon-containing material to form a second mixture; and milling the second mixture to preparing the composite.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
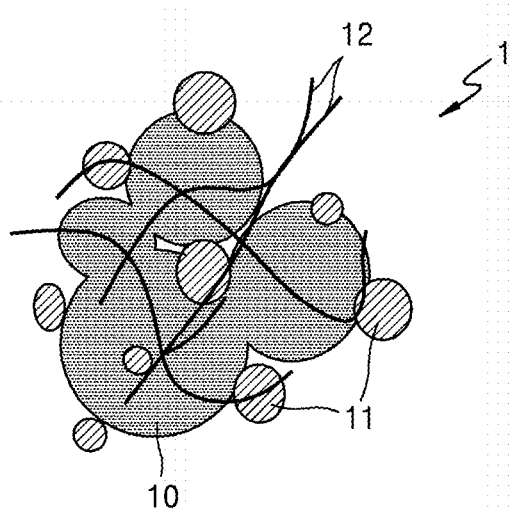
FIG. 1 is a diagram schematically illustrating a composite for an anode active material according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed item. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

To overcome the shortcomings of silicon anode materials, research is being conducted on which shapes and structures of silicon are preferred to develop materials that exhibit improved capacity and improved charge and discharge characteristics. Introduction of porous silicon particles and use of silicon nanostructures, such as silicon nanowires or nanotubes, to prevent deterioration of battery characteristics caused by the volume expansion of the silicon anode materials has been considered. However, such techniques of controlling the nanostructure of the silicon can use expensive process technology, such as a high-temperature vacuum chemical vapor deposition (CVD) process, or a process using a sacrificial template, or a chemical etching process, resulting in difficulties in commercialization. In addition, the large specific surface area of nano-sized particles has significant adverse effects on the thermal stability of batteries, and resulting in additional difficulties in the commercialization of the silicon anode materials.

For example, a method of preparing a three-dimensional (3D) porous silicon has been attempted, the method including forming a plurality of pores in bulk silicon by depositing a plurality of silver particles onto the bulk silicon and chemically etching. The plurality of pores formed may serve to decrease a total expansion coefficient of the silicon. However, the method of preparing the 3D porous silicon uses a high-cost noble metal catalyst and the porous silicon does not have a high porosity, and thus desired effects are not sufficiently obtained therefrom.

As another example, a method of preparing a double-walled silicon nanotube (DWSINT) has been attempted, the method including forming a carbon-based coating layer on an outer wall of a silicon nanotube. The coating layer formed in the method may serve to suppress expansion of silicon. However, special equipment for a chemical vapor deposition (CVD) process or the like is used to perform the method of preparing the DWSINT, resulting in difficulties in their commercialization.

Hereinafter, a composite for an anode active material according to an exemplary embodiment, a method of preparing the composite, an anode including the composite, and a lithium secondary battery including the composite are disclosed in further detail.

The composite according to an exemplary embodiment may include a metal particle, a carbon-based material, and a garnet-type lithium ion conductor.

An amount of the garnet-type lithium ion conductor may be greater than 1 part by weight and less than 5 parts by weight, or about 1.5 parts by weight to about 4 parts by weight, or about 2 parts by weight to about 3 parts by weight, based on 100 parts by weight of the total amount of the metal particle, the carbon-based material, and the garnet-type lithium ion conductor.

When the amount of the garnet-type lithium ion conductor is not within the above-described range, the lithium secondary battery including the anode that includes the composite may have a low initial charge and discharge efficiency and degraded lifespan characteristics.

As used herein, the term 'composite' refers to a material formed by combining two or more materials having different physical or chemical properties than each other, wherein the composite has properties different from individual materials constituting the composite, and wherein the individual materials are macroscopically or microscopically separated and distinguishable from each other in a finished structure of the composite.

The metal particle may serve to carry out intercalation and deintercalation of lithium ions.

The metal particle may comprise silicon (Si), tin (Sn), germanium (Ge), aluminum (Al), or a combination thereof, or an alloy comprising Si, Sn, Ge, Al, or a combination thereof. A combination comprising at least one of the foregoing may be used.

An amount of the metal particle may be in a range of about 10 parts by weight to about 90 parts by weight, about 50 parts by weight to about 88 parts by weight, or about 60 parts by weight to about 86 parts by weight, based on 100 parts by weight of the carbon-based material. When the amount of the metal particle is within the above-described range, the anode including the composite may have a sufficiently high capacity and a volume expansion of the metal particle may be somewhat suppressed during charging of the lithium secondary battery including the anode. For example, the amount of the metal particle may be in a range of about 65 parts by weight to about 70 parts by weight, based on 100 parts by weight of the carbon-based material.

While not wanting to be bound by theory, the carbon-based material may carry out intercalation and deintercalation of the lithium ions, and also to improve electrical conductivity of the anode including the composite. In addition, during charging of the lithium secondary battery including the anode that includes the composite, the carbon-based material may suppress volume expansion of the metal particle, and thus, after a number of charge and discharge cycles, the carbon-based material may prevent the metal particle from being pulverized. Thus, the carbon-based material may improve lifespan characteristics of the anode including the composite and the lithium secondary battery including the anode.

In addition, the carbon-based material may provide an improved electrical path in the composite such that components of the composite may maintain electrical contact therebetween. As such, the carbon-based material may provide the electrical path that is connected without disconnection in the composite. In this regard, even in a case where a part of the composite is degraded, the carbon-based material may prevent the degraded part from being electrically isolated. As a result, the anode may have improved electrochemical characteristics because a structure of the composite is stabilized. Thus, the anode and the lithium secondary battery including the anode may have improved durability.

The carbon-based material may include a carbon nanotube (CNT), a carbon nanofiber, graphene, graphite, or a combination thereof.

The garnet-type lithium ion conductor may improve an ionic conductivity of the anode including the composite. In addition, during charging of the lithium secondary battery including the anode that includes the composite, the garnet-type lithium ion conductor may suppress volume expansion of the metal particle, and thus, after a number of charge and discharge cycles, the garnet-type lithium ion conductor may prevent the metal particle from being pulverized. Thus, the garnet-type lithium ion conductor may improve lifespan characteristics of the anode including the composite and the lithium secondary battery including the anode.

The garnet-type lithium ion conductor may be represented by Formula 1A below:

$$L_{5+x}E_3Me_zM_{2-z}X_d \qquad \text{Formula 1A}$$

In Formula 1A, L may be at least one of a monovalent cation and a divalent cation, and a part or all of L is lithium (Li); E may be a trivalent cation; Me and M may each independently be a trivalent cation, a tetravalent cation, a pentavalent cation, or a hexavalent cation; $0<x\leq3$, $0\leq z<2$, and $0<d\leq2$; and X may comprise O, a pentavalent anion, a hexavalent anion, a heptavalent anion, or a combination thereof.

In Formula 1A, when x satisfies $0<x\leq2.5$, E may be lanthanum (La), and M may be zirconium (Zr).

In Formula 1A, at least a part of E may be substituted with a Group 1 element having an atomic weight of at least 10 to provide a composite represented by Formula 1B.

$$L_{5+x}E_{3-a}Q_aMe_zM_{2-z}X_d \qquad \text{Formula 1B}$$

wherein, in Formula 1B, L is a monovalent cation, a divalent cation, or a combination thereof and comprises lithium, E is a trivalent cation, Q is a Group 1 element having an atomic weight of at least 10, Me and M are each independently a trivalent cation, a tetravalent cation, a pentavalent cation, or a hexavalent cation, X comprises O, a pentavalent anion, a hexavalent anion, a heptavalent anion, or a combination thereof, $0<x\leq3$, $0\leq z<2$, $0<d\leq2$, and $0<a\leq3$.

Accordingly, the Group 1 element having an atomic weight of at least 10 may be present within a crystalline structure of the garnet-type oxide, e.g., to provide a garnet-type lithium ion conductor.

The Group 1 element having an atomic weight of at least 10 may be present at a grain boundary of the garnet-type oxide to provide the garnet-type lithium ion conductor of Formula 1B.

An amount of the Group 1 element having an atomic weight of at least 10 may be in a range of about 0.25 part by weight to about 3.85 parts by weight, e.g., about 0.5 part by weight to about 2.0 parts by weight, or about 0.75 part by weight to about 3 parts by weight, based on 100 parts by weight of the total amount of the garnet-type lithium ion conductor.

The garnet-type lithium ion conductor may include a garnet-type oxide represented by Formula 2 below:

$$L_{5+x+2y}D_yE_{3-y}Me_zM_{2-z}X_d \qquad \text{Formula 2}$$

In Formula 2, L may be at least one of a monovalent cation and a divalent cation, and a part or all of L is Li; D may be a monovalent cation; E may be a trivalent cation; Me and M may each independently be a trivalent cation, a tetravalent cation, a pentavalent cation, or a hexavalent cation; $0<x+2y\leq3$, $0<y\leq0.5$, $0\leq z<2$, and $0<d\leq2$; and X may comprise O, a pentavalent anion, a hexavalent anion, a heptavalent anion, or a combination thereof.

In Formula 2, when x and y may satisfy 0<x+2y≤2.5, E may be La, and M may be Zr.

In the garnet-type oxide of Formula 2, at least a part of the trivalent cations present at a dodecahedral site may be substituted with a monovalent cation having a larger ionic radius than that of the trivalent cation. Such substitution in the garnet-type oxide of Formula 2 provides an increased lattice constant and reduced activation energy.

In addition, in the garnet-type oxide of Formula 2, at least a part of the trivalent cations present at a dodecahedral site may be substituted with a monovalent cation having a smaller electronegativity than that of the trivalent cation, and thus a distance between oxygen ions in the vicinity of lithium ions present at a tetrahedral site and/or an octahedral site may vary. As a result, migration of the lithium ions may be facilitated.

The garnet-type oxide of Formula 2 may be represented by Formula 3 below:

$L_{5+x+2y}D_yLa_{3-y}Me_zZr_{2-z}X_d$  Formula 3

In Formula 3, L may be at least one of a monovalent cation and a divalent cation, and a part or all of L is Li; D may be a monovalent cation; Me may be a trivalent cation, a tetravalent cation, a pentavalent cation, or a hexavalent cation; 0<x+2y≤3, 0<y≤0.5, 0≤z<2, and 0<d≤2; and X may be 0, a pentavalent anion, a hexavalent anion, a heptavalent anion, or a combination thereof. In an exemplary embodiment, x and y in Formula 3 may satisfy 0<x+2y≤1. In another exemplary embodiment, x and y in Formula 3 may satisfy 1<x+2y≤2. In another exemplary embodiment, x and y in Formula 3 may satisfy 2<x+2y≤2.5.

The garnet-type oxide of Formula 2 may be represented by Formula 4 below:

$Li_{5+x+2y}D_yLa_{3-y}Zr_2X_d$  Formula 4

In Formula 4, D may be potassium (K), rubidium (Rb), or cesium (Cs); 0<x+2y≤3, 0<y≤0.5, and 0<d≤2; and X may be 0, a pentavalent anion, a hexavalent anion, a heptavalent anion, or a combination thereof.

In Formula 4, x and y may satisfy 2<x+2y≤3.

When the monovalent cation, which substitutes for the trivalent cation of the garnet-type oxides of Formulae 1 to 4, has a larger ionic radius than that of the trivalent cation, the migration of the lithium ions may be more facilitated.

D in Formulae 1 to 4 may be K, Rb, Cs, or a combination thereof.

Me in Formulae 1 to 4 may be a transition metal, For example, Me in Formulae 1 to 4 may include tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), zinc (Zn), chromium (Cr), or a combination thereof.

L in Formulae 1 to 4 may include lithium (Li), sodium (Na), magnesium (Mg), calcium (Ca), potassium (K), hydrogen (H), or a combination thereof. For example, L in Formulae 1 to 4 may include a Li ion, and optionally, a monovalent and/or divalent ion, such as Na and Mg.

The garnet-type oxides of Formulae 1 to 4 may have an ionic conductivity of at least about $3\times10^{-4}$ siemens per centimeter (S/cm) at a temperature of 25° C. For example, the garnet-type oxides of Formulae 1 to 4 may have an ionic conductivity of at least about $6\times10^{-4}$ S/cm, at least about $6.5\times10^{-4}$ S/cm, at least about $7\times10^{-4}$ S/cm, at least about $7.5\times10^{-4}$ S/cm, at least about $8\times10^{-4}$ S/cm, or at least about $8.3\times10^{-4}$ S/cm, at a temperature of 25° C.

The garnet-type oxides of Formulae 1 to 4 may have an activation energy in a range of less than about 0.34 electron volts (eV) at a temperature in a range of about −10° C. to about 100° C. For example, the garnet-type oxides of Formulae 1 to 4 may have an activation energy of about 0.30 eV or less or about 0.29 eV or less, at a temperature in a range of about −10° C. to about 100° C. As the activation energy decreases, the ionic conductivity of each of the garnet-type oxides according to a temperature becomes insensitive to temperature, and thus, the garnet-type oxides of Formulae 1 to 4 may have improved low-temperature characteristics.

Hereinafter, a method of preparing the garnet-type lithium ion conductor will be disclosed in further detail.

The method of preparing the garnet-type lithium ion conductor may include: forming a precursor mixture by mixing precursors of the garnet-type lithium ion conductor and milling the resultant; and sintering the precursor mixture in an air atmosphere at a temperature of about 800° C. to about 1,250° C. for about 2 hours to about 40 hours. For example, the method of preparing the composite may comprise mixing the metal particle and the garnet-type lithium ion conductor to form a first mixture; milling the first mixture; mixing the milled first mixture with a carbon-containing material to form a second mixture; and milling the second mixture to preparing the composite.

Any suitable precursor including a metal of the garnet-type lithium ion conductor and available in the art may be used as the precursor of the garnet-type lithium ion conductor.

The sintering of the precursor mixture may be performed at a temperature of about 900° C. to about 1,200° C., about 950° C. to about 1,150° C., or about 1000° C. to about 1,100° C. for about 5 hours to about 30 hours, about 7 hours to about 25 hours, or about 9 hours to about 20 hours.

When the temperature at which the sintering is performed is too low, reactive sintering may be insufficient. However, when the temperature at which the sintering is performed is too high, lithium may be subjected to phase decomposition or volatilization. In addition, when the time for which the sintering is performed is too short, reactive sintering may be insufficient. However, when the time for which the sintering is performed is too long, lithium may volatilize.

The method of preparing the garnet-type lithium ion conductor may further include: preliminarily sintering the precursor mixture at a relatively low temperature, before the sintering of the precursor mixture. The preliminarily sintering of the precursor mixture may be performed twice or more times, e.g., 2 to 10 times.

The method of preparing the garnet-type lithium ion conductor may further include: milling the sintered resultant products after the sintering of the precursor mixture.

The milling may be each performed using any suitable mill, such as a ball mill. For example, the milling may be each performed using a spex mill or a planetary mill.

The garnet-type lithium ion conductor obtained according to the above-described method may have various forms, such as powder, a thin film, or a pellet, and the form thereof may be appropriately selected according to the use thereof.

FIG. 1 is a diagram schematically illustrating a composite for an anode active material 1 according to an exemplary embodiment.

Referring to FIG. 1, the composite 1 may include a metal particle 10, a garnet-type lithium ion conductor 11, and a carbon-based material 12.

The garnet-type lithium ion conductor 11 and the carbon-based material 12 may be disposed on a surface of the metal particle 10 and/or may be disposed close to the surface.

Hereinafter, a method of preparing the composite anode active material according to an exemplary embodiment will be disclosed in further detail.

Figure 2:
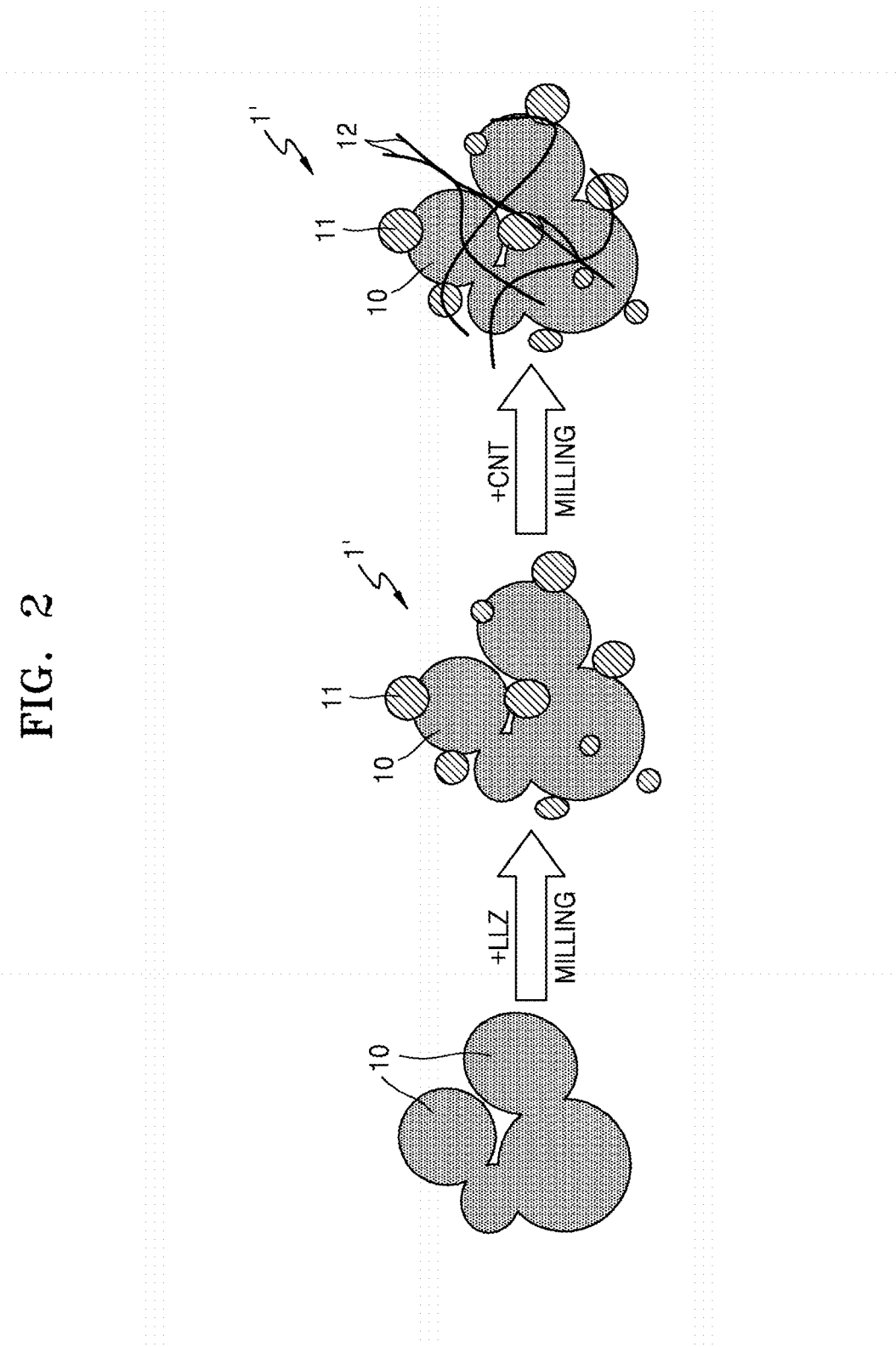
FIG. 2 is a diagram illustrating a method of preparing the composite anode active material according to an exemplary embodiment.

FIG. 2 is a diagram illustrating a method of preparing the composite anode active material according to an exemplary embodiment.

Referring to FIG. 2, the method of preparing the composite includes: performing a first step of mixing the metal particles 10 with the garnet-type lithium ion conductors (LLZ) 11 to form a first mixture and milling the first mixture; and performing a second step of mixing the milled first mixture, e.g., a precursor 1' of a composite for an anode active material with carbon-based materials (e.g., CNTs) 12 to form a second mixture and milling the second mixture.

According to the milling of the first step, the precursor 1' including the metal particles 10 and the garnet-type lithium ion conductors 11 disposed on at least a surface of the metal particles 10 may be obtained.

According to the milling of the second step, a composite 1 for an anode active material may be obtained, the composite 1 including the metal particles 10 and the garnet-type lithium ion conductor 11 and the carbon-based material 12, which are formed on at least a surface of the metal particles 10.

Each of the milling of the first step and the milling of the second step may be performed for about 120 minutes or less, for example, about 60 minutes or less, 10 minutes or less, or for about 1 minute to about 120 minutes, or about 1 minute to about 8 minutes.

An apparatus used for the milling process is not particularly limited, and any suitable apparatus available in the art may be used. For example, the milling process may be performed using a spex mill or a planetary mill.

Each of the milling of the first step and the milling of the second step may be performed according to, other than the dry milling as described above, a wet milling using a medium.

Before performing each of the milling of the first step and the milling of the second step, at least one of the metal particle 10, the garnet-type lithium ion conductor (LLZ) 11, the precursor 1' of a composite anode active material, and the carbon-based material (e.g., CNT) 12 may be added to a medium to be subjected to sonification or a stirring process. Following the sonification or stirring process, the medium may be removed, and then the milling described above may be performed. Following the sonification or stirring process, the composite 1 anode active material having improved dispersity of the garnet-type lithium ion conductor 11 and the carbon-based material 12 may be finally obtained.

The medium may comprise an alcohol (e.g., a C1 to C20 alcohol such as ethanol), acetone, water, N-methyl-2-pyrrolidone (NMP), toluene, tetrahydrofuran (THF), hexane, or a combination thereof.

Hereinafter, an anode according to an exemplary embodiment will be disclosed in further detail.

The anode may include the composite anode active material described above.

The anode may further include an additional anode active material that is suitable for use in a lithium secondary battery in addition to the composite anode active material.

The additional anode active material may include a carbon-based material capable of intercalating or deintercalating lithium ions, such as graphite (which may be identical to or different from the graphite that can be used as the carbon-based material included in the composite anode active material) or carbon; a lithium metal; an alloy of the lithium metal; or a silicon oxide-based material. A combination comprising at least one of the foregoing may be used.

The anode may further include a binder and/or a conductive agent in addition to the composite anode active material and the additional anode active material, if present.

The binder may facilitate adherence between components such as the composite anode active material, the additional anode active material, and the conductive agent, and adherence of the anode to a current collector. Examples of the binder include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof.

The binder may include lithium ions.

The amount of the binder may be in a range of about 1 part by weight to about 20 parts by weight, for example, in a range of about 2 parts by weight to about 7 parts by weight, based on 100 parts by weight of the total amounts of the composite anode active material and the additional anode active material. When the amount of the binder is within the range above, e.g., about 1 part by weight to about 20 parts by weight, the adherence of the anode to the current collector may be suitably strong.

The conductive agent is not particularly limited as long as the conductive agent has suitable conductivity and does not induce an undesirable chemical change in the lithium secondary battery including the conductive agent.

The conductive agent may include a carbonaceous conductive agent selected from carbon black, carbon fiber, and graphite (which may be identical to or different from the graphite that can be used as the carbon-based material included in the composite anode active material), or a combination thereof. The carbon black may be, for example, selected from acetylene black, Ketjen black, Super P carbon, channel black, furnace black, lamp black, thermal black, or a combination thereof. The graphite may include natural graphite, artificial graphite, or a combination thereof.

The anode may further include, an additional conductive agent other than the carbonaceous conductive agent described above.

The additional conductive agent may be selected from a conductive fiber, such as a metal fiber; a metal powder such as a fluorinated carbon powder, an aluminum powder, or a nickel powder; a conductive whisker such as a zinc oxide or a potassium titanate; a polyphenylene derivative; or a combination thereof.

The amount of the conductive agent may be in a range of about 0.5 part by weight to about 10 parts by weight, for example, in a range of about 0.01 part by weight to about 5 parts by weight, based on 100 parts by weight of the total amounts of the composite anode active material and additional anode active material. When amount of the conductive agent is within the range above, e.g., about 0.5 part by weight to about 10 parts by weight, an anode having improved ion conductivity may be finally obtained.

The anode may be, for example, prepared as follows.

First, the composite anode active material, the additional anode active material, the binder, a solvent, the carbonaceous conductive agent, and/or the additional conductive agent are mixed to prepare a composition for forming an anode active material layer.

Thereafter, the composition for forming the anode active material layer may be coated on an anode current collector, and then, dried to prepare an anode.

The anode current collector may have a thickness in a range of about 3 micrometers (μm) to about 500 μm. The anode current collector is not particularly limited as long as the current collector has sufficient conductivity and does not induce an undesirable chemical change in the lithium secondary battery including the anode current collector. For example, the anode current collector may include copper; stainless steel; aluminum; nickel; titanium; heat treated carbon; copper or stainless steel surface-treated with carbon, nickel, titanium or silver; or an aluminum-cadmium alloy. A combination comprising at least one of the foregoing may be used. Also, as in an embodiment including a cathode current collector which will be further described below, the surface of the anode current collector may be roughened, e.g., to include a minute concavity and convexity on the surface of the anode current collector to improve adherence of the anode active material to the anode current collector. The anode current collector may be used in any suitable form, such as a film, a sheet, a foil, a net, a porous body, a foaming body, a non-woven fabric, or a combination thereof.

The solvent may include N-methyl pyrrolidone (NMP), acetone, water, or a combination thereof. An amount of the solvent may be in a range of about 1 part by weight to about 50 parts by weight, based on 100 parts by weight of the anode active material. When the amount of the solvent is within the range above, formation of the active material layer may be facilitated.

A lithium secondary battery according to an exemplary embodiment includes the anode.

Figure 3:
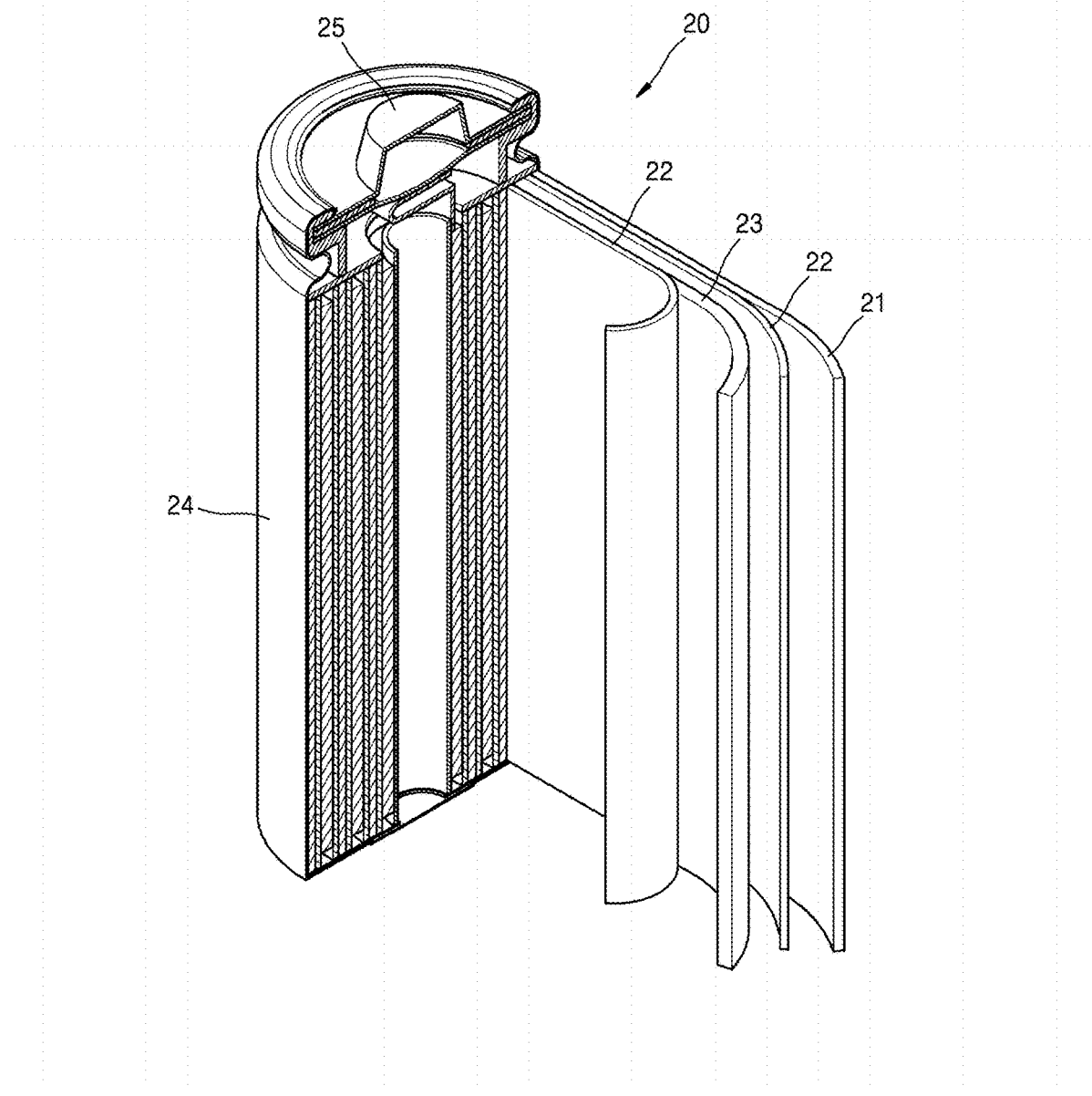
FIG. 3 is a schematic diagram schematically illustrating a structure of a lithium secondary battery according to an exemplary embodiment.

FIG. 3 is a schematic diagram illustrating a structure of a lithium secondary battery 20 according to an exemplary embodiment of the present inventive concept.

Referring to FIG. 3, the lithium secondary battery 20 includes a cathode 23, an anode 21, and a separator 22.

The cathode 23, the anode 21, and the separator 22 may be wound or folded and disposed in a battery case 24. Subsequently, an electrolyte (not shown) is injected into the battery case 24, and the battery case 24 is sealed by a cap assembly 25, thereby completing the preparation of the lithium secondary battery 20. The battery case 24 may be a coin, rectangular, or thin-film type. For example, the lithium secondary battery 20 may be a large thin-film-type battery.

The lithium secondary battery 20 may have improved initial charge and discharge efficiency and lifespan.

Hereinafter, a method of preparing the lithium secondary battery will be described in further detail.

First, an anode is prepared by the method described above.

Thereafter, a cathode is prepared using a method similar to the method of preparing the anode. For example, a lithium transition metal oxide, a binder, a conductive agent, and a solvent may be mixed to prepare a composition for forming a cathode active material layer. Subsequently, the composition for forming the cathode active material layer may be coated on the cathode current collector, and then, dried to prepare a cathode.

The types and the amounts of the binder, the conductive agent, and the solvent used to prepare the composition for forming the cathode active material layer may be the same as those for preparing the composition for forming the anode active material layer.

The anode active material may include $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, and $a+b+c=1$), $LiNi_{1-Y}Co_YO_2$, $LiCo_{1-Y}Mn_YO_2$, $Li Ni_{1-Y}Mn_YO_2$ (wherein $0\leq Y<1$), $LiMn_{2-z}Ni_3O_4$, $LiMn_{2-z}Co_zO_4$ (wherein $0<Z<2$), $LiCoPO_4$, $LiFePO_4$, or a combination thereof.

The cathode current collector may have a thickness in a range of about 3 μm to about 500 μm. The cathode current collector is not particularly limited as long as the current collector has sufficient conductivity and does not induce an undesirable chemical change in the lithium secondary battery including the cathode current collector. For example, the cathode current collector may include stainless steel; aluminum; nickel; titanium; heat treated carbon; aluminum or stainless steel surface-treated with carbon, nickel, titanium, or silver; or a combination thereof. Also, a surface roughness including a minute concavity and convexity may be formed on the surface of the cathode current collector to improve adherence of the cathode active material to the cathode current collector, and the cathode current collector may be used in various forms such as a film, a sheet, a foil, a net, a porous body, a foaming body, or a non-woven fabric.

The lithium secondary battery may be prepared by disposing a separator between the cathode and the anode and supplying an organic liquid electrolyte thereto.

The lithium secondary battery may be prepared by, for example, sequentially stacking the anode, the separator, and the cathode; winding or folding the stacked structure, then enclosing the wound or folded structure in a coin or rectangular type battery case or a pouch; and then disposing, e.g., injecting, the organic liquid electrolyte into the battery case or the pouch to manufacture the lithium secondary battery.

The separator can be porous, and a diameter of a pore of the separator may be in a range of about 0.01 μm to about 10 μm, and a thickness of the separator may be in a range of about 5 μm to about 300 μm. In greater detail, the separator may be a sheet or a non-woven fabric made of olefin-based polymer such as polypropylene or polyethylene; or a glass fiber.

The organic liquid electrolyte may be prepared by dissolving a lithium salt in an organic solvent.

The organic solvent may comprise propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolan, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethylether, or a combination thereof.

The lithium salt may comprise $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof.

In a lithium secondary battery according to another exemplary embodiment, an organic solid electrolyte and/or an inorganic solid electrolyte may be used, optionally in combination with the organic liquid electrolyte. When the organic solid electrolyte and/or the inorganic solid electrolyte are used, the organic solid electrolyte and/or inorganic solid electrolyte may act as a separator in some cases, and thus, the separator may be omitted if desired.

As the organic solid electrolyte, for example, a polyethylene derivative, a polyethylene oxide derivative, a polypropylene oxide derivative, a phosphoric acid ester polymer, a polyester sulfide, polyvinyl alcohol, a polyvinylidene fluoride, or a combination thereof may be used.

As the inorganic solid electrolyte, for example, a lithium nitride, a lithium halogenide, or a lithium sulfide, such as $Li_3N$, $LiI$, $Li_5NI_2$, $Li_3N$—$LiI$—$LiOH$, $Li_2SiS_3$, $Li_4SiO_4$, $Li_3PO_4$—$Li_2S$—$SiS_2$, or a combination thereof may be used.

Hereinafter, an exemplary embodiment will now be described in greater detail with reference to the following examples. However, the following examples are for illustrative purposes only and are not intended to limit the scope of the disclosure.

EXAMPLES

Preparation Example 1: Preparation of a Garnet-Type Lithium Ion Conductor ($Li_7La_3Zr_2O_{12}$)

$LiOH.H_2O$ as an Li precursor, $La_2O_3$ as a La precursor, and $ZrO_2$ as a Zr precursor, which were used as starting materials, were stoichiometrically mixed together to obtain $Li_{5+x+2y}D_yLa_{3-y}Zr_2O_{12}$ where x=2 and y=0.

The mixture was pulverized by mixing in 2-propanol using a planetary ball mill (400 rpm, zirconia oxide balls) for 6 hours. The pulverized mixed powder was put in an alumina crucible and sintered in an air atmosphere at 900° C. for 12 hours.

To supplement a loss amount of Li, an excess amount of LiOH corresponding to 10 wt % of the amount of the Li, based on the amount of Li in the composition of a final product, was used.

The mixture with LiOH added thereto was pulverized by mixing in 2-propanol using a planetary ball mill (500 rpm, zirconia oxide balls) for 6 hours. The sintered powder was cooled and molded in the form of a pellet and sintered in an air atmosphere at 1,100° C. for 20 hours, thereby completing the preparation of a garnet-type lithium ion conductor.

Example 1 and Comparative Examples 1 to 3: Preparation of a Composite for an Anode Active Material, an Anode, a Coin Half Cell, and a Coin Full Cell

Comparative Example 1: Preparation of a Composite for an Anode Active Material Silicon nanoparticles (SiNPs) (silicon nanopowder, a product of CN Vision Co. Ltd.) were mixed with carbon nanotubes (CTube-120, a product of CNT Co. Ltd). Afterwards, the mixture was milled using a mechanical milling apparatus (SPEX Mill) for about 30 minutes, thereby obtaining a composite for an anode active material.

Example 1 and Comparative Examples 2 and 3: Preparation of a Composite for an Anode Active Material SiNPs (silicon nanopowder, a product of CN Vision Co. Ltd.) were mixed with the garnet-type lithium ion conductor of Preparation Example 1. Afterwards, the mixture was milled using a mechanical milling apparatus (SPEX Mill) for about 30 minutes, thereby obtaining a precursor of the composite for an anode active material. Then, the precursor of the composite anode active material was mixed with carbon nanotubes (CTube-120, a product of CNT Co. Ltd). Afterwards, the mixture was milled using a mechanical milling apparatus (SPEX Mill) for about 30 minutes, thereby obtaining a composite for an anode active material.

A ratio at which the silicon nanoparticles, the carbon nanotubes, and the garnet-type lithium ion conductor are mixed in each of the example and the comparative examples above are shown in Table 1 below.

TABLE 1

| Component | Amounts (parts by weight) | | | |
| --- | --- | --- | --- | --- |
| | Example 1 | Comparative Example 1 | Comparative Example 2 | Comparative Example 3 |
| Silicon nanoparticles | 67 | 70 | 69 | 65 |
| Carbon nanotubes | 30 | 30 | 30 | 30 |
| Garnet-type lithium ion conductor | 3 | 0 | 1 | 5 |

(Preparation of an Anode)

20 parts by weight of each of the composite anode active material, 80 parts by weight of graphite (MC20, a product of Mitsubishi Chemical Co., Ltd.), and 10 parts by weight of a binder solution (i.e., a 4 volume % Li-PAA solution prepared by dissolving PAA (polyacrylic acid, a product of Aldrich) in water to obtain an aqueous PAA solution and adding LiOH to the aqueous PAA solution) were mixed together to prepare a composite for forming an anode active material layer. Subsequently, the composition for forming the anode active material layer was coated on a copper film, which is an anode current collector, to have a thickness of 100 μm. The coated copper film was dried first at a temperature of 80° C., dried a second time at a temperature of 120° C. in a vacuum, and then the dried product was roll-pressed to prepare an anode.

(Preparation of a Coin Half Cell)

Thereafter, the anode was rolled into a cylinder having a diameter of 12 mm and a lithium metal was used as a counter electrode to prepare a 2032-type coin half cell. In this regard, the organic liquid electrolyte was a 1.3M $LiPF_6$ solution in a mixture of ethylene carbonate, diethylene carbonate, and fluoroethylene carbonate at a weight ratio of 2:6:2.

(Preparation of a Coin Full Cell)

$Li_{1.2}Ni_{0.13}Co_{0.13}Mn_{0.53}O_2$ (622 NCM) as a cathode active material, polyvinylidene fluoride (PVDF) as a binder, and Denka black as a conductive agent were mixed at a weight ratio of 92:4:4 to obtain a solid-state mixture. Afterwards, the solid-state mixture was dispersed in N-methyl-2-pyrrolidone to obtain a composition for forming a cathode active material layer. Subsequently, the composition for forming the cathode active material layer was coated on an aluminum foil having a thickness of 15 μm. The coated aluminum foil was dried first in an oven at a temperature of 90° C. for about 2 hours, and dried a second time in a vacuum oven at a temperature of 120° C. for about 2 hours, thereby completely evaporating the solvent. Then, the resultant product was rolled and punched to prepare a cathode.

The cathode, the anodes of Example 1 and Comparative Examples 1 to 3, a polyethylene separator, and a liquid electrolyte were used to prepare 18650-type coin full cells. In this regard, the liquid electrolyte was a solution containing 1.1M $LiPF_6$ and 0.2M $LiBF_4$ in a mixture of ethylene carbonate, diethylene carbonate, and fluoroethylene carbonate at a weight ratio of 2:6:2.

EVALUATION EXAMPLES

Evaluation Example 1: Analysis of an X-Ray Diffraction (XRD) Pattern of a Composite for an Anode Active Material The XRD patterns of the composites for an anode active material of Example 1 and Comparative Examples 1 to 3 were each analyzed by using a Rigaku RINT2200HF+ diffractometer with Cu Kα radiation (1.540598 Å) and results obtained therefrom are shown in FIG. 4.

Figure 4:
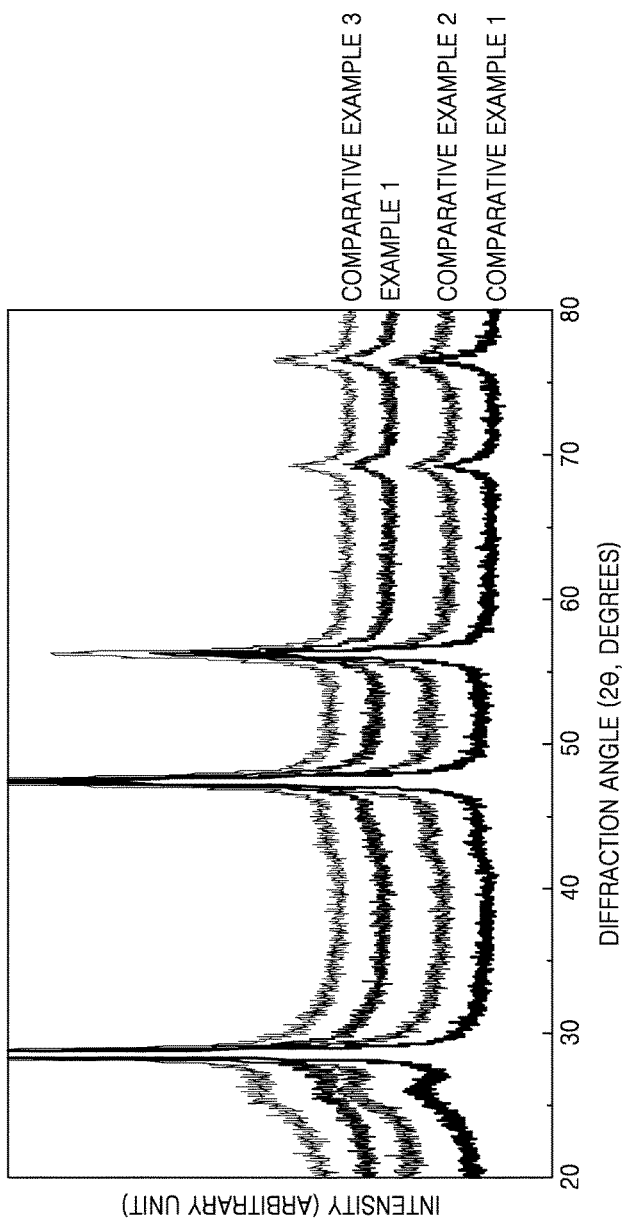
FIG. 4 is a graph of intensity (arbitrary units) versus diffraction angle (2θ, degrees) which shows the results of X-ray diffraction (XRD) analysis of the composites anode active materials prepared in Example 1 and Comparative Examples 1 to 3 according to an exemplary embodiment.

Referring to FIG. 4, it was confirmed that the crystalline structures of the composites prepared in each example were not significantly different from each other. In this regard, it was confirmed that the addition of the garnet-type lithium ion conductor did not produce impurities in the composites that were finally obtained and did not change the crystalline structures of the final composites. That is, the addition of the garnet-type lithium ion conductor produced the composites having satisfactory crystallinity.

Figure 5:
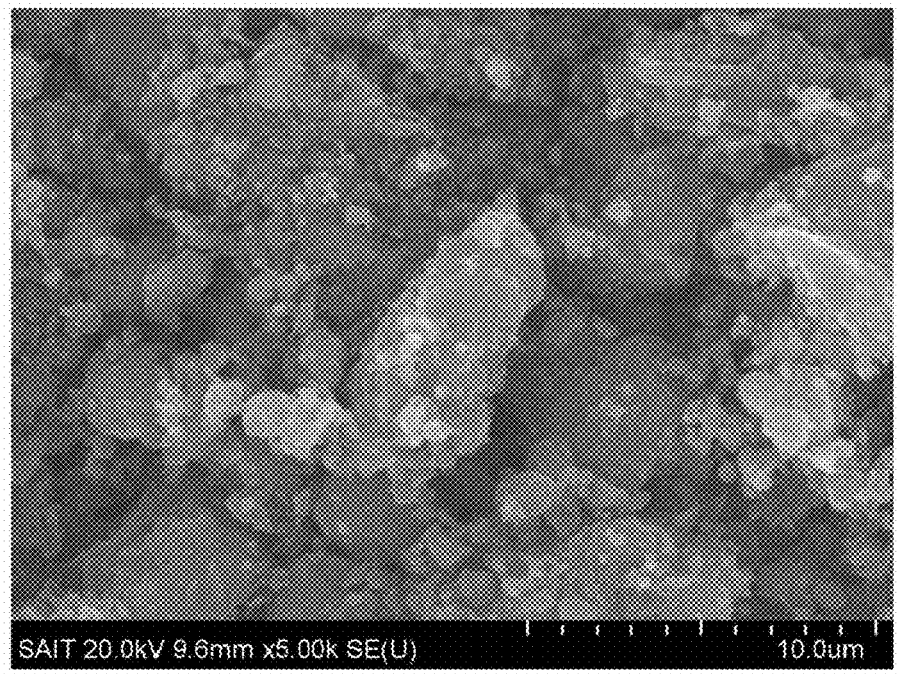
FIG. 5 is a scanning electron microscope (SEM) image of the composite prepared in Example 1 according to an exemplary embodiment.

Evaluation Example 2: Analysis of a Scanning Electron Microscope (SEM) Image of a Composite for an Anode Active Material SEM images of the composites of Example 1 and Comparative Example 1 are captured by a SEM-FIB device (FEI, Helios 450F1) and are respectively shown in FIGS. 5 and 6. FIG. 5 is an SEM image of the composite of Example 1, and FIG. 6 is an SEM image of the composite of Comparative Example 1.

Figure 6:
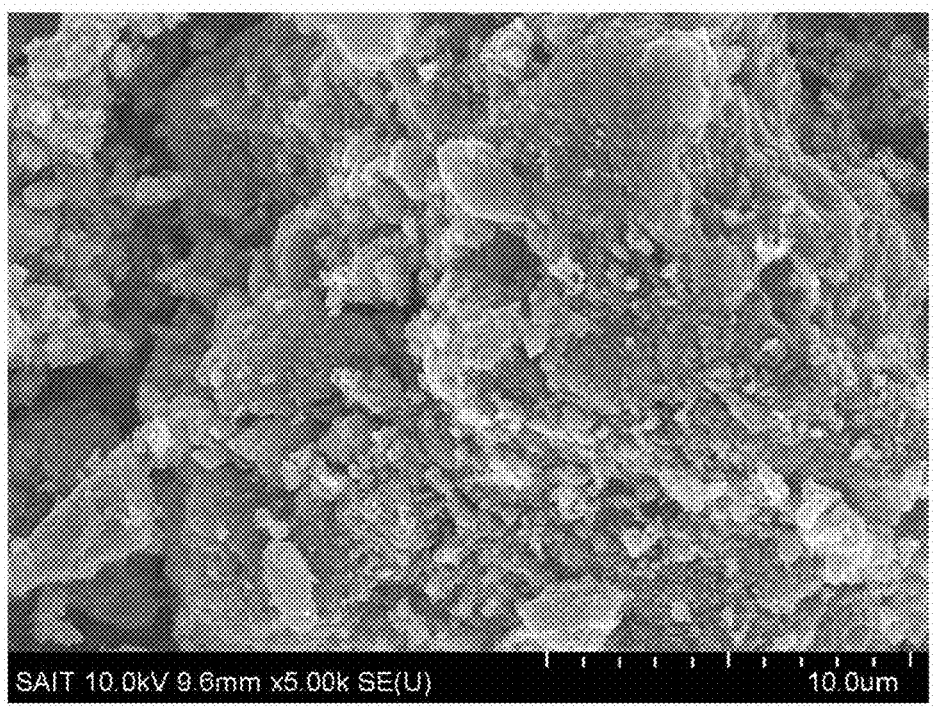
FIG. 6 is an SEM image of the composite prepared in Comparative Example 1.

Referring to FIGS. 5 and 6, it was confirmed that the composite of Example 1 showed more uniform particle distribution than particle distribution of the composite of Comparative Example 1.

Evaluation Example 3: Analysis of an Energy Dispersive Spectrometer (EDS) Mapping Images of a Composite for an Anode Active Material An EDS mapping image of the composite of Example 1 was captured by an energy dispersive X-ray spectrometer (Bruker, D8 Adavance), and is shown in FIG. 7.

Figure 7:
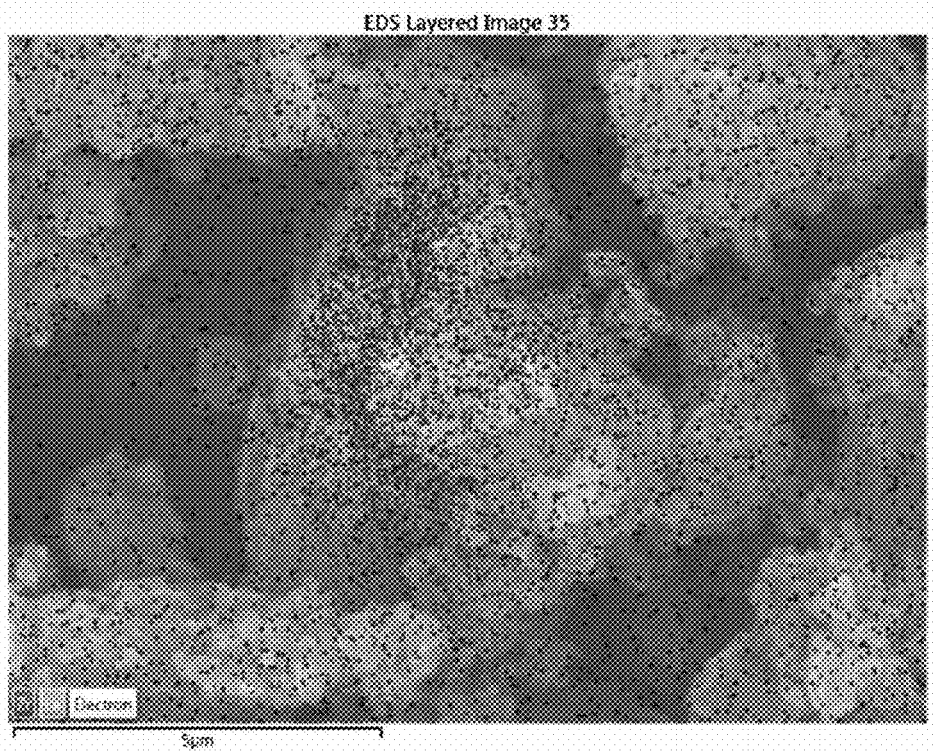
FIG. 7 is an image obtained by performing energy dispersive X-ray spectrometry (EDS) mapping on the composite prepared in Example 1 according to an exemplary embodiment.

Referring to FIG. 7, it was confirmed that the garnet-type lithium ion conductor was included in the composite of Example 1 (based on the presence of La and Zr in the EDS mapping image).

Evaluation Example 4: Evaluation of Charge and Discharge Characteristics of a Coin Half Cell Charge and discharge characteristics of the coin half cells of Example 1 Comparative Examples 1 to 3 were evaluated by using a charger and discharger (TOYO-3100, a product of TOYO SYSTEM Co. Ltd). In greater detail, in a first cycle (n=1), each of the coin half cells was charged at a C-rate of 0.1 C (unit: mA/g) until a voltage of 0.01 V was reached, and then, discharged at a rate of 0.1 C until a voltage of 1.5 V was reached. Then, each of the coin half cells was rested for 10 minutes. Subsequently, in a second cycle (n=2), each of the coin half cells was charged at a C-rate of 0.2 C (unit: mA/g) at room temperature (25° C.) until a voltage of 0.01 V was reached, and then, discharged at a rate of 0.2 C until a voltage of 1.5 V was reached. Then, each of the coin half cells was rested for 10 minutes. Subsequently, in a third cycle (n=3) or beyond (n>3), each of the coin half cells was charged at a C-rate of 1.0 C (unit: mA/g) at room temperature (25° C.) until a voltage of 0.01 V was reached, and then, discharged at a rate of 1.0 C until a voltage of 1.5 V was reached. The charge and discharge cycle described above was repeated 80 times (i.e., n=80). The letter "C" denotes a discharge rate of a cell, which is a value obtained by dividing a total capacity of the cell by a total discharge time.

Evaluation of Initial Charge and Discharge Efficiency and Capacity Retention

An initial charge and discharge efficiency and a capacity retention in a $80^{th}$ charge and discharge cycle of each of the coin half cells of Example 1 and Comparative Examples 1 and 3 were evaluated, and results obtained therefrom are shown in Table 2 below.

TABLE 2

| | Example 1 | Comparative Example 1 | Comparative Example 2 | Comparative Example 3 |
|---|---|---|---|---|
| Initial charge and discharge efficiency *1 (%) | 89.5 | 88.5 | 88.0 | 85.2 |
| Capacity retention *2 (@ $80^{th}$ cycle) | 89.6 | 84.8 | 83.2 | 88.0 |

*1 Initial charge and discharge efficiency = (discharge capacity of the cell in a $2^{nd}$ cycle/charge capacity of the cell in the $1^{st}$ cycle) × 100
*2 capacity retention of the $80^{th}$ cycle = (discharge capacity of the cell in the $80^{th}$ cycle)/(discharge capacity of the cell in the $3^{rd}$ cycle) × 100

Referring to Table 2, the coin half cell of Example 1 has improved initial charge and discharge efficiency and excellent capacity retention in the $80^{th}$ cycle compared to those of the coin half cells of Comparative Examples 1 to 3.

Comparison of Cycle Lifespan Characteristics

Figure 8:
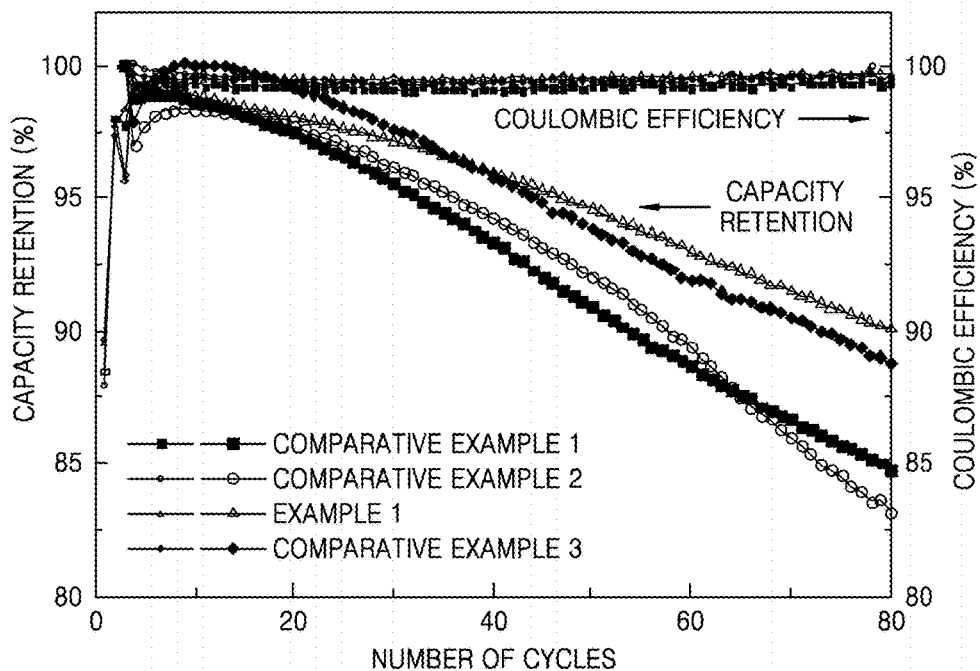
FIG. 8 is a graph of capacity retention (percent, %) versus number of cycles showing changes in capacity retention and coulombic efficiency with respect to a number of charge-discharge cycles of coin-type half cells prepared in Example 1 and Comparative Examples 1 to 3.

Lifespan of each of the coin half cells of Example 1 and Comparative Examples 1 to 3 was shown in FIG. 8. In FIG. 8, a coulombic efficiency is calculated according to Equation 1 below:

$$\text{Coulombic efficiency (\%)} = (\text{discharge capacity of the cell in the } n^{th} \text{ cycle})/(\text{charge capacity of the cell in the } n^{th} \text{ cycle}) \times 100\% \quad \text{Equation 1}$$

Referring to FIG. 8, it was confirmed that the coin half cell of Example 1 had excellent lifespan characteristics compared to that of the coin half cells of Comparative Examples 1 to 3.

Evaluation Example 5: Evaluation of Charge and Discharge Characteristics of a Coin Full Cell A charge and discharge test was performed on the coin full cells of Example 1 and Comparative Examples 1 to 3 as follows.

First, each of the coin full cells was charged at a C-rate of 0.1 C at a temperature of 25° C. until a voltage of 4.2 V was reached, and then, discharged at a C-rate of 0.1 C until a voltage of 2.5 V was reached (a first cycle in a formation process).

Then, each of the coin full cells was charged at a C-rate of 0.1 C at a temperature of 25° C. until a voltage of 4.2 V was reached, and then, discharged at a C-rate of 0.1 C until a voltage of 2.5 V was reached (a second cycle in the formation process). The C rate is a discharge rate of a cell, and is obtained by dividing a total capacity of the cell by a total discharge period of time, e.g., a C rate for a battery having a discharge capacity of 1.6 ampere-hours would be 1.6 amperes.

Subsequently, each of the coin full cells undergone the formation process was charged at a C-rate of 1 C at a temperature of 25° C. until a voltage of 4.2 V was reached, and then, discharged at a C-rate of 1 C until a voltage of 2.5 V was reached. A discharge capacity of each of the coin full cells was measured at the point, and the measured value was recorded as the discharge capacity in the $1^{st}$ cycle. The charge and discharge cycle described above was repeated 100 times.

Figure 9:
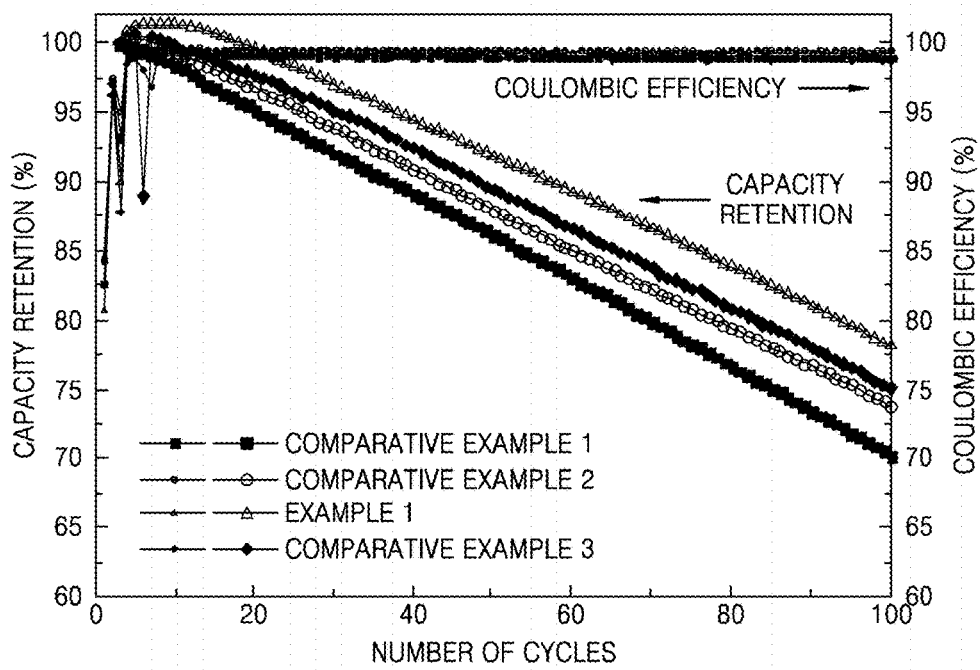
FIG. 9 is a graph of capacity retention (percent, %) versus number of cycles showing changes in capacity retention and coulombic efficiency with respect to a number of charge-discharge cycles of coin-type half cells prepared in Example 1 and Comparative Examples 1 to 3.

A capacity retention and a coulombic efficiency of each of the coin full cells in each cycle were calculated, and results obtained therefrom are shown in FIG. 9. In FIG. 9, the coulombic efficiency is calculated according to Equation 1 above. In addition, the capacity retention in the $100^{th}$ cycle is shown in Table 3 below.

TABLE 3

| | Example 1 | Comparative Example 1 | Comparative Example 2 | Comparative Example 3 |
|---|---|---|---|---|
| Capacity retention *1 (@ $100^{th}$ cycle) | 78.1 | 70.1 | 72.2 | 75.0 |

*1 capacity retention = (discharge capacity of the cell in the $100^{th}$ cycle)/(discharge capacity of the cell in the $1^{st}$ cycle) × 100%

Referring to Table 3 and FIG. 9, it was confirmed that the coin full cell of Example 1 had improved lifespan characteristics and high capacity retention in the $100^{th}$ cycle compared to those of the coin full cells of Comparative Examples 1 to 3.

The composite anode active material according to the exemplary embodiment may act as a support against volume expansion of the electrodes during charging and discharging of the cells to ease the volume expansion of the electrodes. In addition, the composite anode active material allows lithium ions to quickly pass therethrough to improve ion conductivity of the electrodes. In this regard, a contact surface area between metal particles (e.g., Si) and an electrolyte decreases, and a side reaction at an interface is less likely to occur. Accordingly, an electrode including the composite anode active material may have excellent lifespan characteristics.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite anode active material, the composite consisting of:
   a metal particle;
   a carbon-containing material; and
   a garnet-type lithium ion conductor,
   wherein an amount of the garnet-type lithium ion conductor is greater than 1 part by weight and less than 5 parts by weight, based on 100 parts by weight of a total weight of the metal particle, the carbon-containing material, and the garnet-type lithium ion conductor.

2. The composite of claim 1, wherein the metal particle comprises silicon, tin, germanium, aluminum, a combination thereof, or an alloy thereof.

3. The composite of claim 1, wherein the carbon containing material comprises a carbon nanotube, a carbon nanofiber, graphene, graphite, or a combination thereof.

4. The composite of claim 1, wherein the garnet-type lithium ion conductor comprises a garnet-type oxide represented by Formula 1A:

$$L_{5+x}E_3Me_zM_{2-z}X_d \qquad \text{Formula 1A}$$

wherein, in Formula 1A,
L is a monovalent cation, a divalent cation, or a combination thereof and comprises lithium,
E is a trivalent cation,
Me and M are each independently a trivalent cation, a tetravalent cation, a pentavalent cation, or a hexavalent cation,
X comprises O, a pentavalent anion, a hexavalent anion, a heptavalent anion, or a combination thereof, and
$0<x\leq3$, $0\leq z<2$, and $0<d\leq12$.

5. The composite of claim 4, wherein L in Formula 1A comprises lithium, sodium, magnesium, calcium, potassium, hydrogen, or a combination thereof.

6. The composite of claim 4, wherein Me in Formula 1A comprises a transition metal.

7. The composite of claim 4, wherein Me in Formula 1A comprises tantalum, niobium, yttrium, scandium, tungsten, molybdenum, antimony, bismuth, hafnium, vanadium, germanium, silicon, aluminum, gallium, titanium, cobalt, indium, zinc, chromium, or a combination thereof.

8. The composite of claim 1, wherein the garnet-type lithium ion conductor has an ionic conductivity of at least about $3.0\times10^{-4}$ siemens per centimeter at a temperature of 25° C.

9. The composite of claim 1, wherein an amount of the metal particle is in a range of about 10 parts by weight to about 90 parts by weight, based on 100 parts by weight of the carbon-containing material.

10. The composite of claim 1, wherein the garnet-type lithium ion conductor comprises a garnet-type oxide represented by $$L_{5+x}E_{3-a}Q_aMe_zM_{2-z}X_d \qquad \text{Formula 1B}$$

wherein, in Formula 1B,
L is a monovalent cation, a divalent cation, or a combination thereof and comprises lithium,
E is a trivalent cation,
Q is a Group 1 element having an atomic weight of at least 10,
Me and M are each independently a trivalent cation, a tetravalent cation, a pentavalent cation, or a hexavalent cation,
X comprises O, a pentavalent anion, a hexavalent anion, a heptavalent anion, or a combination thereof,
$0<x\leq3$, $0\leq z<2$, $0<d\leq12$, and $0<a\leq3$.

11. The composite of claim 10, wherein an amount of the Group 1 element having an atomic weight of at least 10 is in a range of about 0.25 part by weight to about 3.85 parts by weight, based on 100 parts of weight of a total amount of the garnet-type lithium ion conductor.

12. The composite of claim 11, wherein the Group 1 element having an atomic weight of at least 10 is present at a grain boundary of the garnet-type oxide of Formula 1B.

13. The composite of claim 1, wherein the garnet-type lithium ion conductor comprises a garnet-type oxide represented by Formula 2:

$$L_{5+x+2y}D_yE_{3-y}Me_zM_{2-z}X_d \qquad \text{Formula 2}$$

wherein, in Formula 2,
L is a monovalent cation, a divalent cation, or a combination thereof and comprises Li, D is a monovalent cation, E is a trivalent cation, Me and M are each independently a trivalent cation, a tetravalent cation, a pentavalent cation, or a hexavalent cation, X comprises O, a pentavalent anion, a hexavalent anion, a heptavalent anion, or a combination thereof, and $0<x+2y\leq 3$, $0<y\leq 0.5$, $0<z<2$, and $0<d\leq 12$.

14. An anode comprising the composite of claim 1.

15. The anode of claim 14, further comprising an additional anode active material.

16. A lithium secondary battery comprising the anode of claim 14.

17. A method of preparing the composite of claim 1, the method comprising:

mixing a metal particle and a garnet-type lithium ion conductor to form a first mixture;

milling the first mixture;

mixing the milled first mixture with a carbon-containing material to form a second mixture; and milling the second mixture to preparing the composite.

18. The composite of claim 1, wherein the amount of the garnet-type lithium ion conductor is about 2 parts by weight to about 3 parts by weight, based on 100 parts by weight of the total amount of the metal particle, the carbon-based material, and the garnet-type lithium ion conductor.

19. The composite of claim 1, wherein an amount of the metal particle is in a range of about 50 parts by weight to about 88 parts by weight, based on 100 parts by weight of the carbon-containing material.

20. The composite of claim 1, wherein the metal particle comprises silicon.

* * * * *